US010464018B2

(12) United States Patent
Voskian et al.

(10) Patent No.: US 10,464,018 B2
(45) Date of Patent: Nov. 5, 2019

(54) ELECTROCHEMICAL PROCESS FOR GAS SEPARATION

(71) Applicant: Massachusetts Institute of Technology, Cambridge, MA (US)

(72) Inventors: Sahag Voskian, Cambridge, MA (US); Trevor Alan Hatton, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 355 days.

(21) Appl. No.: 15/335,258

(22) Filed: Oct. 26, 2016

(65) Prior Publication Data

US 2017/0113182 A1    Apr. 27, 2017

Related U.S. Application Data

(60) Provisional application No. 62/246,640, filed on Oct. 27, 2015.

(51) Int. Cl.
*B01D 53/32* (2006.01)

(52) U.S. Cl.
CPC ...... *B01D 53/326* (2013.01); *B01D 2257/504* (2013.01)

(58) Field of Classification Search
CPC ................. B01D 53/326; B01D 2257/504
See application file for complete search history.

(56) References Cited

U.S. PATENT DOCUMENTS

| | | | |
|---|---|---|---|
| 3,540,934 A | 11/1970 | Boeke | |
| 5,776,351 A * | 7/1998 | McGinness | C02F 1/4672 134/10 |
| 2002/0163135 A1 * | 11/2002 | Kato | A62D 3/115 277/459 |
| 2005/0227071 A1 * | 10/2005 | Muraoka | B82Y 10/00 428/403 |
| 2007/0092769 A1 | 4/2007 | Davis et al. | |
| 2010/0219068 A1 | 9/2010 | Yamauchi et al. | |
| 2013/0084474 A1 | 4/2013 | Mills | |
| 2013/0122382 A1 | 5/2013 | Mizuhata et al. | |
| 2014/0332406 A1 * | 11/2014 | Nottke | C25F 7/00 205/763 |
| 2015/0110694 A1 * | 4/2015 | Eltayeb | B01J 19/088 423/225 |
| 2015/0207165 A1 | 7/2015 | Schubert et al. | |
| 2017/0113951 A1 * | 4/2017 | Su | C02F 1/4672 |
| 2018/0215635 A1 * | 8/2018 | Roberts | C02F 1/463 |

OTHER PUBLICATIONS

International Search Report and Written Opinion dated Mar. 2, 2017 for Application No. PCT/US2016/058806.
International Preliminary Report on Patentability dated May 11, 2018 for Application No. PCT/US2016/058806.
Invitation to Pay Additional Fees dated Dec. 22, 2016 for Application No. PCT/US2016/058806.
Partial European Search Report for Application No. EP 16860661.4 dated Jun. 24, 2019.

* cited by examiner

*Primary Examiner* — Steven A. Friday

(74) *Attorney, Agent, or Firm* — Wolf, Greenfield & Sacks, P.C.

(57) ABSTRACT

The present disclosure generally relates to apparatuses, systems, and methods for separating a target species (e.g., $CO_2$) from a gas mixture (e.g., gas stream) via an electrochemical process.

16 Claims, 14 Drawing Sheets

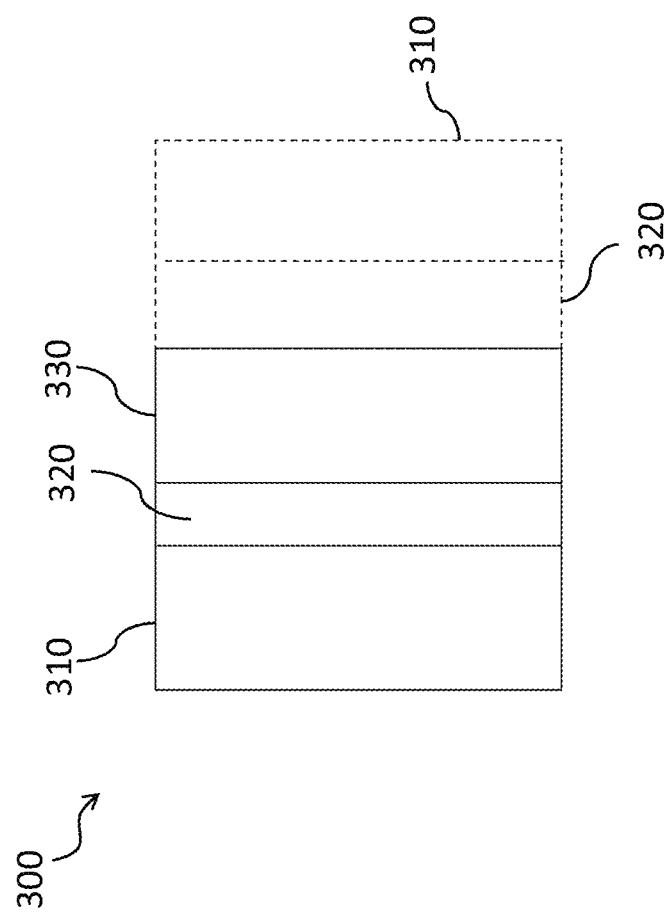

ELECTROCHEMICAL PROCESS FOR GAS SEPARATION

RELATED APPLICATIONS

This application claims priority to U.S. Provisional Patent Application Ser. No. 62/246,640, filed Oct. 27, 2015, entitled, "ELECTROCHEMICAL SWING PSEUDOCAPACITIVE PROCESS FOR GAS SEPARATION," which is herein incorporated by reference in its entirety for all purposes.

GOVERNMENT SPONSORSHIP

This invention was made with Government support under Contract No. DE-PI000017 awarded by the Department. of Energy. The Government has certain rights in the invention.

FIELD OF THE INVENTION

The present invention generally relates to apparatuses, systems, and methods for separation of a target species from a gas stream via an electrochemical process.

BACKGROUND OF THE INVENTION

Efforts have been made to remove target species from gas mixtures. For example, over the last two decades there has been a constant effort to mitigate global warming by curbing anthropogenic carbon dioxide ($CO_2$) emission. Carbon capture and storage (CCS) is one of the most studied solutions proposed thus far towards this end, and a number of approaches have been pursued to tackle carbon dioxide at different stages of its production: either post combustion capturing at power plants, or concentrating it from the atmosphere, after which it is either pressurized and stored in geological formations, or it is converted to commercially useful chemical compounds. Thus, a number of carbon capturing methods have been devised with varying degrees of success. However, current methods/systems have many disadvantages, including high energy requirements and waste. Furthermore, conventional thermal methods to capture carbon dioxide are failing to meet the ever-stricter efficiency and capacity criteria set by regulatory agencies. Accordingly, improved apparatuses, methods, and/or systems are needed.

SUMMARY OF THE INVENTION

The present disclosure generally relates to apparatuses, systems, and methods for separating a target species (e.g., $CO_2$) from a gas mixture (e.g., gas stream) via an electrochemical process.

In some embodiments, an electrochemical cell is provided. The electrochemical cell may comprise: a first negative electrode and a second negative electrode, each comprising a gas permeable layer and a primary electroactive composite layer; a positive electrode positioned between the first and second negative electrodes and comprising a first complementary electroactive composite layer facing the first negative electrode and a second complementary electroactive composite layer facing the second negative electrode; a first separator positioned between the first negative electrode and the positive electrode; and a second separator positioned between the second negative electrode and the positive electrode, wherein each of the first and second separators is able to be saturated with an ionic liquid.

In some embodiments, a gas separation system is provided. The gas separation system may comprise a plurality of electrochemical cells in fluid communication with a gas inlet and a gas outlet. Each of the plurality of electrochemical cells may comprise: a first porous negative electrode and a second porous negative electrode, each comprising a first electroactive species; a positive electrode comprising a second electroactive species; a first separator positioned between the first porous negative electrode and the positive electrode; and a second separator positioned between the second porous negative electrode and the positive electrode, wherein each of the first and second separators is able to be saturated with an ionic liquid.

In some embodiments a method of treating a gas stream is provided. The method may comprise applying a first potential difference across an electrochemical cell. The electrochemical cell may comprise: at least one porous negative electrode comprising a first electroactive species; a positive electrode comprising a second electroactive species; and a separator saturated with a conductive liquid and positioned between the at least one porous negative electrode and the positive electrode. The method may further comprise introducing a gas stream comprising a target species to the electrochemical cell to bond the target species to the first electroactive species to produce a treated gas stream.

In some embodiments, a method of operating a gas separation system is provided. The gas separation system may comprise a first set of electrochemical cells and a second set of electrochemical cells. The method may comprise introducing a gas stream comprising a target species to the gas separation system. It may further comprise operating the first set of electrochemical cells in a charge mode to bond the target species to a first electroactive species of the first set of electrochemical cells to produce a treated gas stream. It may further comprise simultaneously operating the second set of electrochemical cells in a discharge mode to release the target species from the first electroactive species of the second set of electrochemical cells to produce a target species-rich gas stream. Each electrochemical cell of the first and second set of electrochemical cells may comprise: at least one porous negative electrode comprising a first electroactive species; a positive electrode comprising a second electroactive species; and a separator saturated with an ionic liquid and positioned between the at least one porous negative electrode and the positive electrode.

BRIEF DESCRIPTION OF THE DRAWINGS

FIG. 3 shows a schematic drawing of an exemplary electrochemical cell, according to one or more embodiments;

Figure 1:
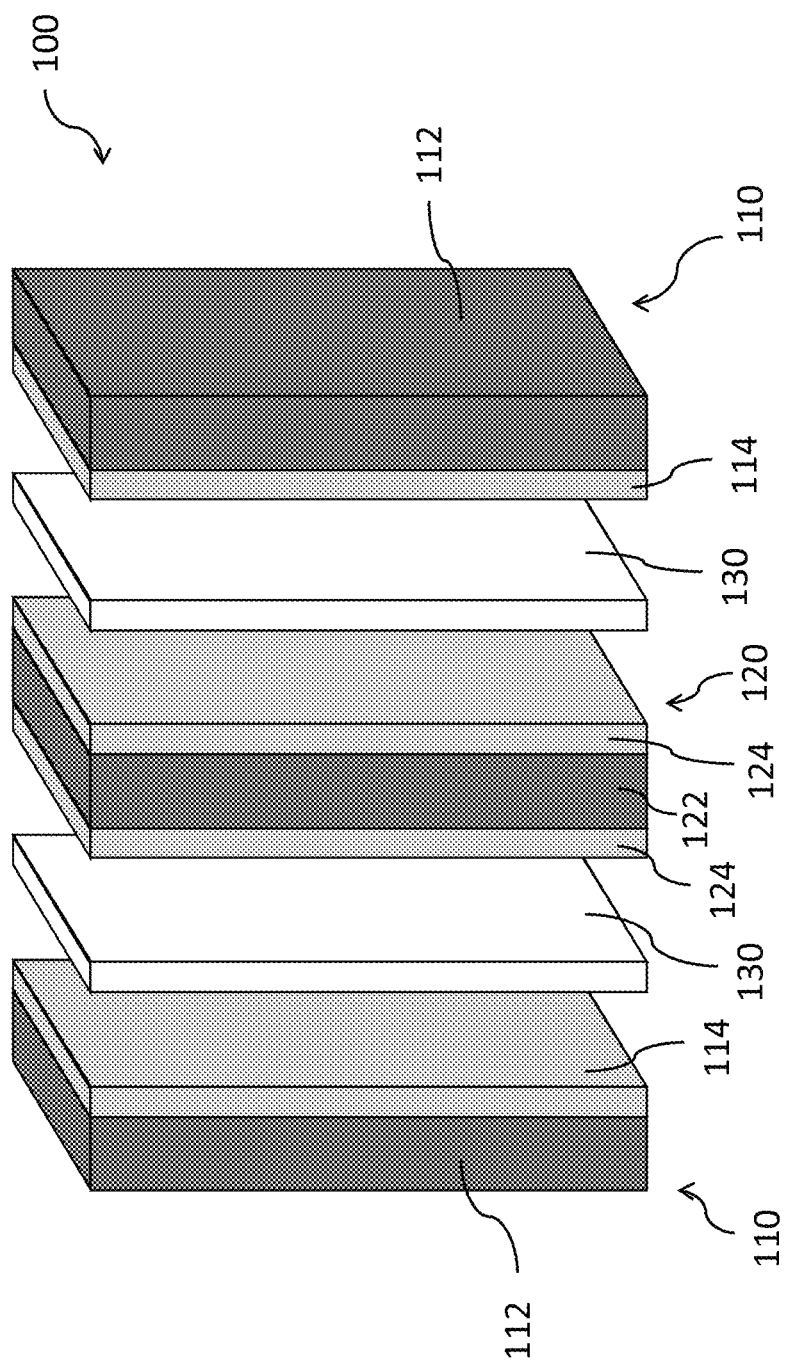
FIG. 1 shows an exploded view of an exemplary electrochemical cell, according to one or more embodiments.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present disclosure generally relates to apparatuses, systems, and methods for separating a target species (e.g., $CO_2$) from a gas mixture (e.g., gas stream) via an electrochemical process.

According to some embodiments, electrochemical swing processes are used to provide gas separation. An electrochemical swing process is a process which may be driven in one direction at one potential and the reverse at a different potential. This may be done using redox-active species, which can be activated at one potential and deactivated at a different potential. In an electrochemical swing separation, the redox-active species may have higher affinity to the elate (or adsorbate), such as a target species, in the activated state than in the deactivated state. According to such embodiments, energy is efficiently delivered to affect electrochemical reactions that result in capturing a target species (e.g., $CO_2$). In some embodiments, the applied electrochemical swing process relies on modulating the oxidation state of an electroactive species, by applying a potential difference across an electrochemical cell where half redox reactions take place at the electrodes. This change in oxidation states of electrolytic species at the electrodes and their subsequent migration in the electrolyte causes, or is the result of, the movement of electrons in an external circuit.

In some embodiments, an electrochemical cell is provided to perform a separation process. The electrochemical cell may comprise an electroactive material that, in its reduced form, selectively binds to $CO_2$ or another target species. In some embodiments, the components of the electrochemical cell may be arranged in a manner that maximizes the electroactive surface area exposed to gas.

According to one or more embodiments, a method for separating a target species (e.g., carbon dioxide) from a gas mixture or a gas stream, with the use of an electrochemical cell, is described. The affinity of an electroactive species of the negative electrode to a target chemical species may be altered by varying its oxidation state. In this manner, the electroactive species may be utilized to capture and release the target chemical species. The redox species, or electroactive species, in the positive electrode may serve as an electron source and sink for the reduction and oxidation of the negative electrode electroactive material, respectively.

According to one or more embodiments, an electrochemical cell for use in such processes is generally described. In some embodiments, the electrochemical cell may comprise a negative electrode and a positive electrode. In some embodiments, the electrochemical cell may comprise a first negative electrode and a second negative electrode with a positive electrode positioned between the negative electrodes.

According to some embodiments, the one or more negative electrodes may comprise a gas permeable layer (also referred to as a substrate layer) and an electroactive composite layer (also referred to as primary electroactive composite layer, herein). In electrochemical cells incorporating two negative electrodes, the materials and components of each of the electrodes may be the same or different.

The positive electrode, in turn, may comprise an electroactive composite layer facing the first negative electrode and a second electroactive composite layer facing the second negative electrode. The electroactive composite layers of the positive electrode may also be referred to as complementary electroactive composite layer, as the electroactive species within it serves as an electron sink or electron source for the electroactive material of the negative electrode.

The electrochemical cell may further comprise separators positioned between each of the negative electrodes and the positive electrode. Each of the first and second separators is able to be saturated with a conductive liquid (e.g., an ionic liquid), such that a conductive liquid (e.g., an ionic liquid) will be present in the separators when the device is being operated.

The primary electroactive composite layer comprises a first electroactive species capable of bonding with the target species gas (e.g. $CO_2$), when the first electroactive species is in a reduced state, and releasing the target species gas, when the first electroactive species is in an oxidized state. The electroactive species may be chosen such that in a reduced state it has a strong affinity for the intended target species for the particular application for which it is intended. For example, in some embodiments, where $CO_2$ is the target species, the chosen electroactive species may have a binding constant with carbon dioxide of $10^1$ to $10^3$ $M^{-1}$. In some embodiments, the chosen electroactive species may have a binding constant with a different target species of $10^1$ to $10^3$ $M^{-1}$. Anthraquinone, for example, in a polymerized form as polyanthraquinone, discussed further within, is an electroactive species that may be used. In some embodiments, in the presence of $CO_2$, anthraquinone is reduced to its dianion in a single step which then binds to $CO_2$ forming a complex. Other electroactive species that would form a covalent bond with $CO_2$, to form a carboxylate moiety, upon reduction may also be used. Additional examples of such electroactive species include thiolates and bipyridines.

The term polyanthraquinone as used herein generally refers to any isomers of polyanthraquinone. Examples of isomers of polyanthraquinone that may be utilized as an electroactive species, include: poly(1,4-anthraquinone) (P14AQ), as represented by formula (I):

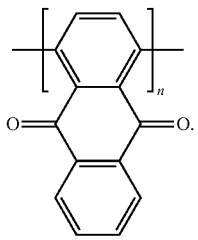 (I)

Other potential isomers include: poly(1,5-anthraquinone) (P15AQ), poly(1,8-anthraquinone) (P18AQ), and poly(2,6-anthraquinone) (P26AQ). Other isomers are also possible.

In addition to the electroactive species, the electroactive composite layer of the negative electrode may also comprise a carbonaceous material. Examples of suitable materials include carbon nanotube (e.g., single-walled carbon nanotube, multi-walled-carbon nanotube), carbon black, KetjenBlack, carbon black Super P, or graphene.

According to some embodiments, the isomer P14AQ is selected for incorporation into a composite layer because of its solubility in chloroform, or other solvents, which allows for a better dispersion of carbonaceous material in the solution.

In some embodiments, the electroactive chemical species may be immobilized onto the negative electrode. Such embodiments may be distinguished from those of other systems, in which the electroactive chemical species are transported from one electrode to another via advection. In some embodiments, the electroactive composite layer comprises an immobilized polymeric composite of the electroactive and carbonaceous material. For example, in some embodiments the electroactive composite layer comprises a polyanthraquinone (pAQ)-carbon nanotube (CNT) composite.

According to one or more embodiments, the electroactive composite layer of the negative electrode may have a particular ratio of weight of electroactive material to carbonaceous material. The ratio by weight may be chosen to facilitate a high electrical current per mass of electroactive material. In some embodiments, a ratio by weight of the mass of electroactive material to the mass of carbonaceous material may be between about 1 to 1 and about 1 to 10. In some embodiments, it may be about 1 to 3. Other ratios are also possible.

The negative electrode may further comprise a gas permeable layer. The gas permeable layer (which may also be referred to as a substrate layer) may be positioned proximate to the electroactive composite layer, and facing outward from the electrochemical cell. A gas stream may diffuse through the gas permeable layer to come into contact with the electroactive composite layer. The gas permeable layer may comprise a conductive material and act as a current collector within the cell.

The gas permeable layer may comprise a porous material. In some embodiments, the layer may have a porosity, for example, of between about 70% and 90%. Other porosities are also possible. Examples of suitable materials for the gas permeable layer include, without limitation, carbon paper (treated, TEFLON-treated, or untreated), carbon cloth, and nonwoven carbon mat. Other materials, may also be used.

Turning to the positive electrode, in some embodiments the positive electrode may comprise an electroactive layer (sometimes referred to as a complementary electroactive layer). The complementary electroactive layer may comprise a second electroactive species. In operation, this second electroactive species may serve as a source of electrons for the reduction of the first electroactive species present in the negative electrode. Likewise, the second electroactive species may serve as a sink for electrons during the oxidation of the first electroactive species. It is in this manner that the electroactive layer of the positive electrode may be described as "complementary." The second electroactive species may comprise, for example, polyvinyl ferrocene. The second electroactive species may comprise, for example, poly(3-(4-fluorophenyl)thiophene), or other Faradaic redox species with a reduction potential at least 0.5 Volts more positive than the first reduction potential of the first electroactive species (e.g., anthraquinone).

As with the primary electroactive composite layer of the negative electrode, the complementary electroactive composite layer of the positive electrode may comprise an immobilized polymeric composite of an electroactive species and of a carbonaceous material. Examples of the carbonaceous material include carbon nanotube (e.g., single-walled carbon nanotube, multi-walled-carbon nanotube), carbon black, KetjenBlack, carbon black Super P, or graphene. Other materials are also possible.

According to one or more embodiments, the electroactive composite layer of the positive electrode may have a particular ratio of weight of electroactive material to carbonaceous material. The ratio by weight may be chosen to facilitate a high electrical current per mass of electroactive material. In some embodiments, a ratio by weight of the mass of electroactive material to the mass of carbonaceous material for the complementary electroactive composite layer may be between about 1 to 2 and about 2 to 1. In some embodiments, it may be about 1 to 1. Other ratios are also possible.

In embodiments of the electrochemical cell in which the positive electrode has a negative electrode on either side, the positive electrode may comprise two electroactive composite layers, each facing one of the negative electrodes.

The positive electrode may further comprise a substrate layer positioned proximate to or between the electroactive composite layer or layers. The substrate layer of the positive electrode may comprise the same or different material as that of the substrate layer of the negative electrode. For example, the substrate layer may comprise a material such as carbon paper (treated, TEFLON-treated, or untreated), carbon cloth, or nonwoven carbon mat. Other materials are also possible. The substrate layer of the positive electrode may comprise a conductive material and act as a current collector within the cell.

A separator may be positioned between the positive electrode and each negative electrode. The separator may serve as a protective layer to isolate the different electrodes from one another and/or other components within the electrochemical cell. The separator may comprise a porous structure. The material for the separator may comprise for example, a cellulose membrane, a polymeric material, or a polymeric-ceramic composite material. Further examples of separators include PVDF separators, PVDF-Alumina separators, or Celgard.

In some embodiments, the electrochemical cell may be provided with the one or more separators saturated in a conductive liquid (e.g., ionic liquid). In some embodiments, the electrochemical cell may be provided without the conductive liquid present in the separator, but with the separator capable of being saturated with the conductive liquid when it is put into operation to perform a gas separation process.

In some embodiments the conductive liquid may comprise an ionic liquid, for example, a room temperature ionic liquid ("RTIL"). The RTIL electrolyte may have a low volatility (i.e., a room temperature vapor pressure of less than $10^{-5}$ Pa, for example, from $10^{-10}$ to $10^{-5}$ Pa), thereby reducing the risk of electrodes drying, and allowing for flow of gas past the electrodes without significant loss to evaporation or entrainment. The room temperature ionic liquid may comprise, for example, 1-butyl-3-methylimidazolium tetrafluoroborate ("Bmim $BF_4$"), represented by the following formula (II):

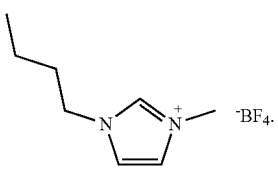

(II)

The ionic liquid may comprise an anion component and a cation component. The anion of the ionic liquid may comprise, without limitation: halide, sulfate, sulfonate, carbonate, bicarbonate, phosphate, nitrate, nitrate, acetate, PF6-, BF4-, triflate, nonaflate, bis(triflyl)amide, trifluoroacetate, heptaflurorobutanoate, haloaluminate, triazolide, and amino acid derivatives (e.g. proline with the proton on the nitrogen removed). The cation of the ionic liquid may comprise, without limitation: imidazolium, pyridinium, pyrrolidinium, phosphonium, ammonium, sulfonium, thiazolium, pyrazolium, piperidinium, triazolium, pyrazolium, oxazolium, guanadinium, and dialkylmorpholinium. In some embodiments, the conductive liquid may comprise a low-volatility electrolyte solution.

An example of an electrochemical cell, according to one or more embodiments and having one or more of the components described above, is depicted in FIG. 1. The electrochemical cell 100 comprises a positive electrode 120 positioned between two negative electrodes 110. Separators 130 separate the positive and negative electrodes 120 and 110. Each of the negative electrodes 110 comprise a gas permeable layer 112, which is positioned away from the center of the cell 100, and a 114 primary electroactive composite layer, which faces toward the positive electrode 120. The positive electrode 120 comprises a substrate layer 122 and two complementary electroactive composite layers 124 deposited thereon. The different components of the electrochemical cell 100 may have certain properties described throughout this disclosure, for example, comprising the electrode materials described above. The configuration of two outwardly-facing negative electrodes 110, as shown, for example, in FIG. 1, may provide the advantage of doubling the gas-adsorbing area exposed to the gas.

According to one or more embodiments, an electrochemical cell generally described herein may be operated to perform a gas separation process. The process may comprise applying a potential difference across the electrochemical cell, and introducing a gas stream comprising a target species (e.g. $CO_2$) to the electrochemical cell to bond the target species to the first electroactive species to produce a treated gas stream.

According to one or more embodiments, the target species may comprise a nucleophilic molecule. According to one or more embodiments, the target species may comprise an aprotic acidic gas. According to one or more embodiments the target species may comprise a gas capable of forming a complex with pAQ, or other electroactive material of the negative electrode. According to one or more embodiments, the target species may comprise carbon dioxide ($CO_2$). According to one or more embodiments, the target species may comprise sulfur dioxide ($SO_2$). According to one or more embodiments the target species may comprise a borane ($BR_3$), wherein each R can be the same or different and is a suitable substituent (e.g., hydrogen, alkyl, aryl, etc., each optionally substituted). In some embodiments, the target species may comprise one species. In some embodiments, the target species may comprise more than one species. The potential window at which capture and release takes place may depend on the particular target species of that embodiment, and hence enriching and stripping of the target species may be controlled by applying the appropriate potential difference applied across the electrochemical cell.

According to some embodiments, application of a positive voltage to the electrochemical cell, during a charging mode, causes a redox half reaction at the negative electrode in which the electroactive species is reduced. As discussed, herein, the electroactive species of the negative electrode is selected for the property of having an improved affinity for the target species (e.g., $CO_2$) when it is in a reduced state. By reducing the electroactive species and passing a gas stream across the face of the negative electrode, a target species (e.g., $CO_2$) may bond to the electroactive species. In such a manner, the target species may be removed from the gas stream to provide a treated gas stream.

According to some embodiments in which the electroactive species of the negative electrode is anthraquinone, the electroactive active species may be reduced according to the following reaction (1):

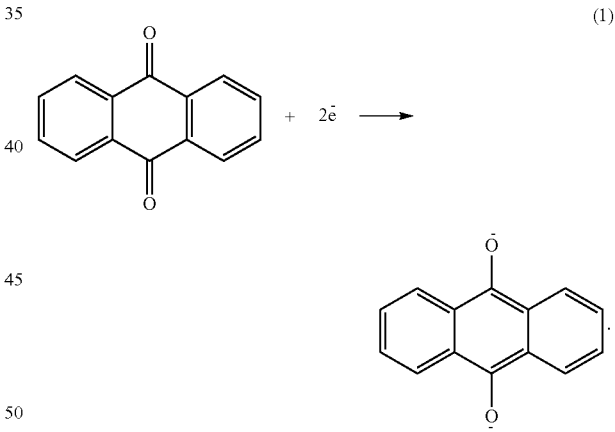

(1)

According to some embodiments in which the electroactive active species is reduced in the presence of a target species comprising carbon dioxide, the following reaction (2) may take place:

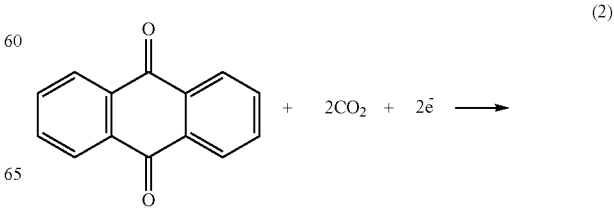

(2)

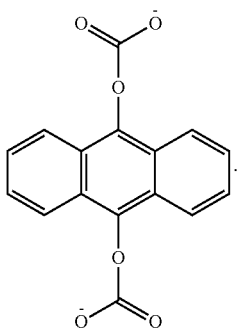

According to some embodiments, while the first electroactive species (e.g., polyanthraquinone) is being reduced at the negative electrode, the second electroactive species (e.g., polyvinyl ferrocene) is being oxidized at the positive electrode. During the charge mode, the oxidation of the second electroactive species provides a source of electrons for driving the reduction of the first electroactive species.

According to some embodiments in which the electroactive species of the positive electrode comprises polyvinyl ferrocene, this second electroactive species may be oxidized according to the following reaction (3):

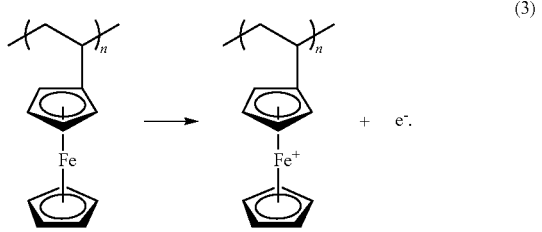

(3)

While each of reactions (1)-(3) are shown taking place in one direction, some reversibility may be exhibited. Analogous reactions may take place with the use of different species, as would be understood by a person of ordinary skill in the art.

According to one or more embodiments, upon charging the electrochemical cell by applying a potential difference across the positive electrode and negative electrodes, electrons flow from the ferrocene (Fc) units in the pVF-CNT composite on the positive electrode, thus oxidizing ferrocene to ferrocenium (Fc$^+$) (as shown by reaction (3)), to the negative electrode, through an external circuit. At the negative electrode, anthraquinone units in the pAQ-CNT composite are reduced to the dianion form p(AQ$^{2-}$) in the presence of CO$_2$, which diffuses into the negative electrode. The dianion readily binds to CO$_2$ via a covalent bond, as represented in equation (2), forming a complex p(AQ·[CO$_2$]$^{2-}$).

The potential difference across the electrochemical cell, during the charge mode, may have a particular voltage. For example, in some embodiments, the potential difference may at least 0 V, at least 0.5 V, at least 1.0 V, or at least 1.5 V. In some embodiments, the potential difference may be less than or equal to 2.0 V, than or equal to 1.5 V, than or equal to 1.0 V, or less than or equal to 0.5 V. Combinations of these voltages are also possible, for example, at least 0.5 V and less than or equal to 2.0 V. Other values are also possible.

Figure 2A:
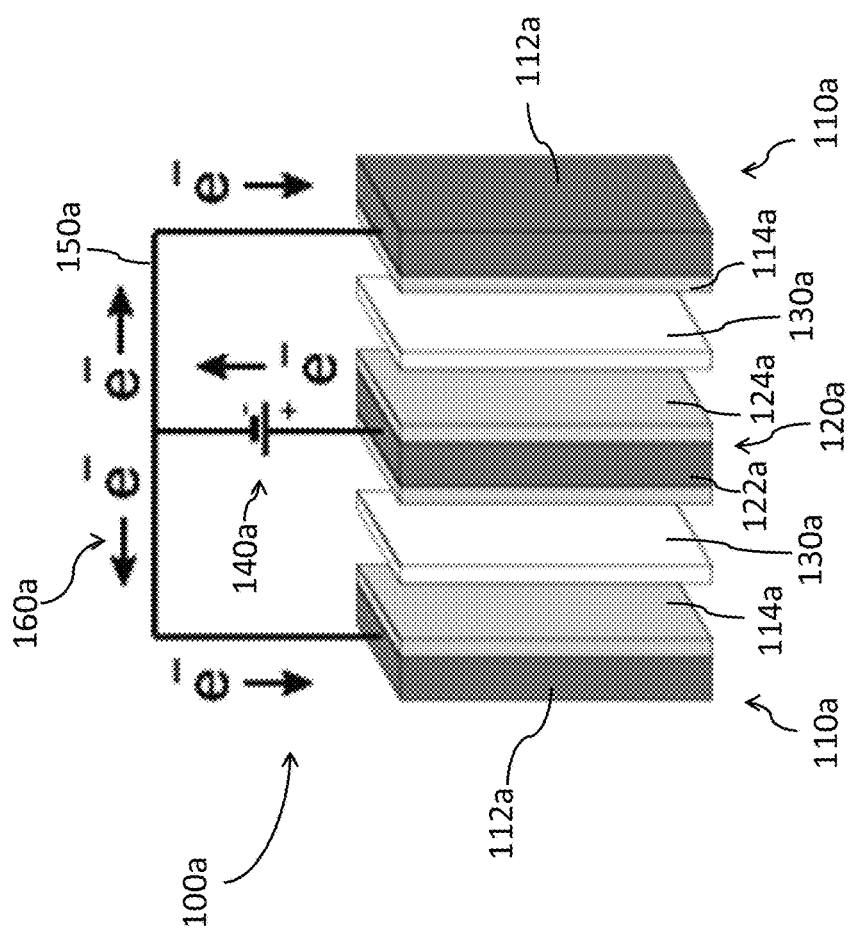
FIG. 2A shows an exploded view of an exemplary electrochemical cell, operating in a charge mode, according to one or more embodiments.

FIG. 2A shows an exploded view of an exemplary electrochemical cell 100a, operating in a charge mode, according to one or more embodiments. The components of electrochemical cell 100a may be like those described with regard to electrochemical cell 100, described herein with regard to FIG. 1. As shown in FIG. 2a, a power source 140a and wiring 150a are used to apply a potential difference across the electrochemical cell 100a. This causes an electron flow 160a in the external circuit 150a directing electrons to the primary electroactive composite layer 114a of each of the negative electrodes 110a. A redox half-cell reaction takes place at the electroactive composite layer 114a to reduce the electroactive species immobilized in the layer 114a. In its reduced state, the electroactive species exhibits an increased affinity towards a target species in a gas stream (not shown). The target species of the gas stream may permeate the gas permeable layer 112A of the negative electrode to bond to the reduced material of the composite layer 114A.

Meanwhile, the positive electrode 120a serves as a source of electrons, during operation in the charge mode. A corresponding redox half-cell reaction takes place at the complementary electroactive composite layer 124a of the positive electrode 120a to oxidize its electroactive species. The oxidation reaction releases electrons from the complementary electroactive species. These electron reaction products may then travel through the substrate layer 122a and/or the external wiring 150a to complete the circuit. Separators 130a separate the positive and negative electrodes 120a and 110a.

According to one or more embodiments, operation of the electrochemical cell may further comprise applying a second potential difference across the electrochemical cell to release the target species from the first electroactive species to produce a target species-rich gas stream. According to some embodiments, after operating an electrochemical cell in the charge mode for a period of time, during which the target species is bonded to the electroactive material of the negative electrode, operation may be switched to a discharge mode. During operation in the discharge mode, the applied voltage is switched to provide an electron flow in the opposite direction from that during the charge mode. While operating in the discharge mode, a negative voltage may be applied across the electrochemical cell. In the discharge mode, a redox half takes place at the negative electrode in which the electroactive species of the negative electrode is oxidized. During operation in the discharge mode, the target species may be released from the material to which it had been bonded in the negative electrode.

According to some embodiments in which the electroactive species of the negative electrode is anthraquinone, the electroactive active species may be oxidized, during a discharge mode, according to the following reaction (4):

(4)

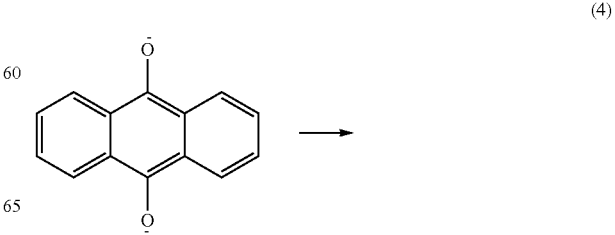

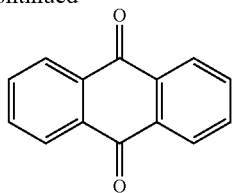

According to some embodiments in which the electroactive active species is oxidized after bonding to a target species comprising carbon dioxide, the following reaction (5) may take place:

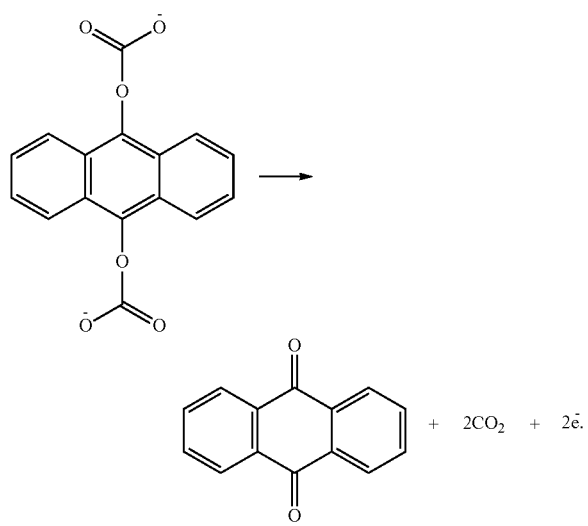

(5)

According to some embodiments, while the first electroactive species (e.g., polyanthraquinone) is being oxidized at the negative electrode, the second electroactive species (e.g., polyvinyl ferrocene) is being reduced as the positive electrode. During the discharge mode, the reduction of the second electroactive species serves as an electron sink.

According to some embodiments in which the electroactive species of the positive electrode comprises polyvinyl ferrocene, this second electroactive species may be reduced according to the following reaction (6):

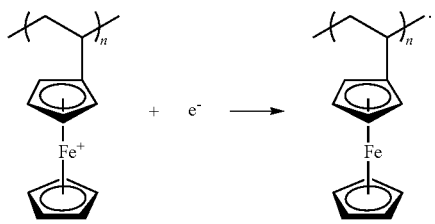

(6)

While each of reactions (4)-(6) are shown taking place in one direction, some reversibility may be exhibited. Analogous reactions may take place with the use of different species, as would be understood by a person of ordinary skill in the art.

According to such embodiments, the electroactive material of the negative electrode is oxidized by discharging the electrochemical cell, when the polarization of the external circuit is altered to allow for the flow of electrons in the reverse direction. The covalent bonds formed between pAQ and $CO_2$ molecules are broken (as shown in reaction (5)) releasing $CO_2$ gas to diffuse out of the negative electrode and electrons which flow to the positive electrode, reducing $Fc^+$ units to Fc (as shown in reaction (6). According to such embodiments, pVF may serve as an electron source for the reduction of p(AQ) or electron sink for the oxidation of $p(AQ.[CO_2]_2^-)$.

The potential difference across the electrochemical cell, during the discharge mode, may have a particular voltage. For example, in some embodiments, the potential difference may be less than 0 V, less than or equal to −0.5 V, less than or equal to −1.0 V, or less than or equal to −1.5 V. In some embodiments, the potential difference may be at least −2.0 V, at least −1.5 V, at least −1.0 V or at least −0.5 V. Combinations of these voltages are also possible, for example, at least −2.0 V and less than or equal to −0.5 V. Other values are also possible.

Figure 2B:
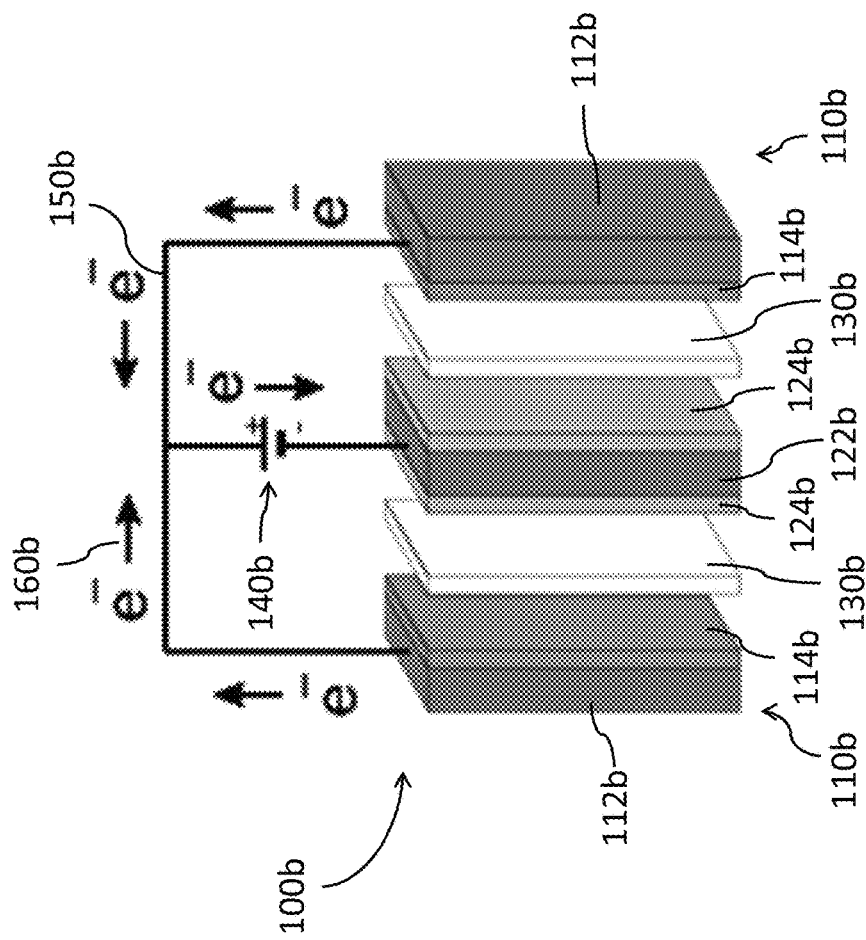
FIG. 2B shows an exploded view of an exemplary electrochemical cell, operating in a discharge mode, according to one or more embodiments.

FIG. 2B shows an exploded view of an exemplary electrochemical cell 100b, operating in a discharge mode, according to one or more embodiments. The components of the electrochemical cell 100b are the same as those of the cell 100a of FIG. 2a. However, the voltage applied by the power source 140b has been altered to create a potential difference that reverses the direction of the electron flow 160b through the external wiring 150b. In discharge mode, a redox half-cell reaction takes place at the electroactive composite layer 114b of the negative electrodes 110b to oxidize the electroactive species immobilized in the layer 114b. In its oxidized state, the electroactive species exhibits a decreased affinity towards the target species, causing the target species to be released from the electroactive material. The released target species exits through the gas permeable layer 112b and may be directed towards further processing, sequestration, or other desired destination.

Meanwhile, the positive electrode 120b serves as an electron sink, during operation in the discharge mode. A half-cell reaction takes place at the complementary electroactive composite layer 124b of the positive electrode 120b to reduce the electroactive species. During the reduction reaction electrons, which have traveled through the wiring 150b and the substrate layer 122b, bond to the complementary electroactive species allowing for a completed circuit. Separators 130b separate the positive and negative electrodes 120b and 110b.

FIG. 3 shows a schematic drawing of an exemplary electrochemical cell 300, according to one or more embodiments. The electrochemical cell 300 comprises a negative electrode 310, a positive electrode 330, and a separator 320 positioned there between. FIG. 3 also shows, as optional, a second negative electrode 310 positioned opposite to the first negative electrode 310 and a second separator 320. The negative electrode 310 comprises a first electroactive species that in a reduced state shows a relatively increased affinity for a target species (e.g. $CO_2$), and that in an oxidized state shows a relatively decreased affinity for the target species (e.g., $CO_2$). The positive electrode 320 comprises a different electroactive species. During operation in either a charge or discharge mode, a potential difference may be applied across the electrochemical cell 300 to cause complementary redox reactions to take place at each of the electrodes 310 and 320, as elsewhere discussed herein.

According to one or more embodiments, one or more electrochemical cells as described herein may be incorporated into a gas separation system. The gas separation system may comprise a plurality of electrochemical cells, according to any of the embodiments described herein, in fluid communication with a gas inlet and a gas outlet.

The gas separation system may comprise an external circuit connecting the first and second porous negative electrodes and the positive electrode of each electrochemical cell to a power source configured to apply a potential difference across the first and second negatives electrodes and the positive electrode of each electrochemical cell.

Figure 4:
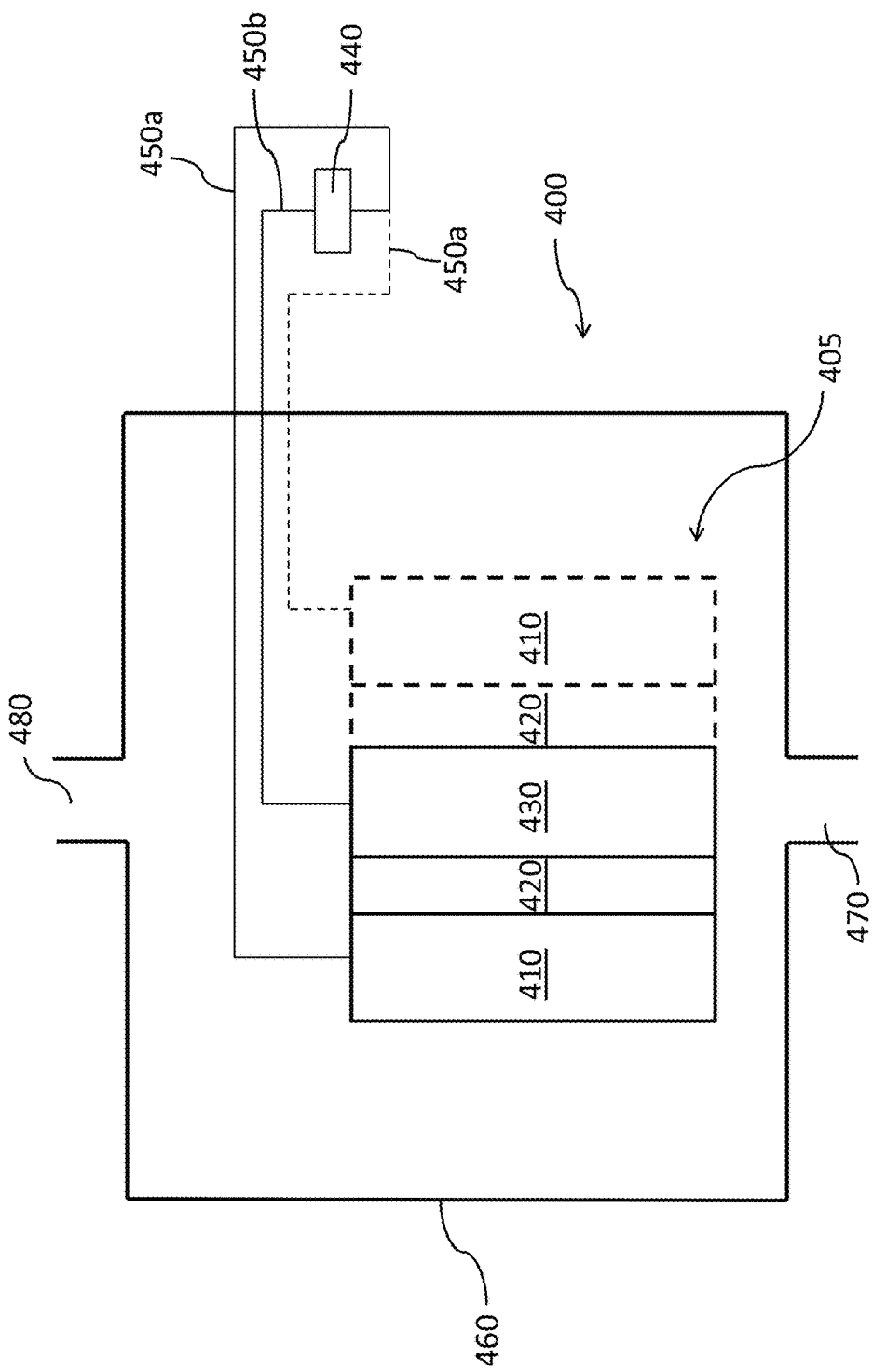
FIG. 4 shows a schematic drawing of an exemplary gas separation system, according to one or more embodiments.

FIG. 4 shows a schematic drawing of an exemplary gas separation system 400, according to one or more embodiments. The system 400 comprises a housing 460 having an inlet 470 and an outlet 480. Positioned within the housing is an electrochemical cell 405. While only one cell 405 is shown in FIG. 4 for the sake of clarity, it will be readily understood by a person of ordinary skill in the art that a plurality of cells 405 could be positioned in the housing 460. A power source 440, which may be positioned inside or outside of housing 460, is connected to the cell 405. The negative electrode(s) 410 are connected to the power source 440 through wiring 450a, while the positive electrode is connected via wiring 450b. While a voltage is applied to operate the cell(s) in a charge mode, as described elsewhere herein, a gas stream that is to be treated is delivered through inlet 470. The gas stream comprises a target species designed to be at least partially removed by the system 400. The gas stream then passes in proximity to the cell 405, in particular, in proximity to the negative electrode(s) 410. The reduced electronegative material in the negative electrode 410 bonds to the target species removing it from the target stream. An optional second negative electrode 410, second separator 420, and corresponding wiring 450a are shown in dashed line. While the embodiments shown in FIG. 4 and other figures comprise an optional housing it should be understood that the electrochemical cell could be positioned in a variety of environments, for example, in-line in a conduit, or otherwise without a housing.

Figure 5:
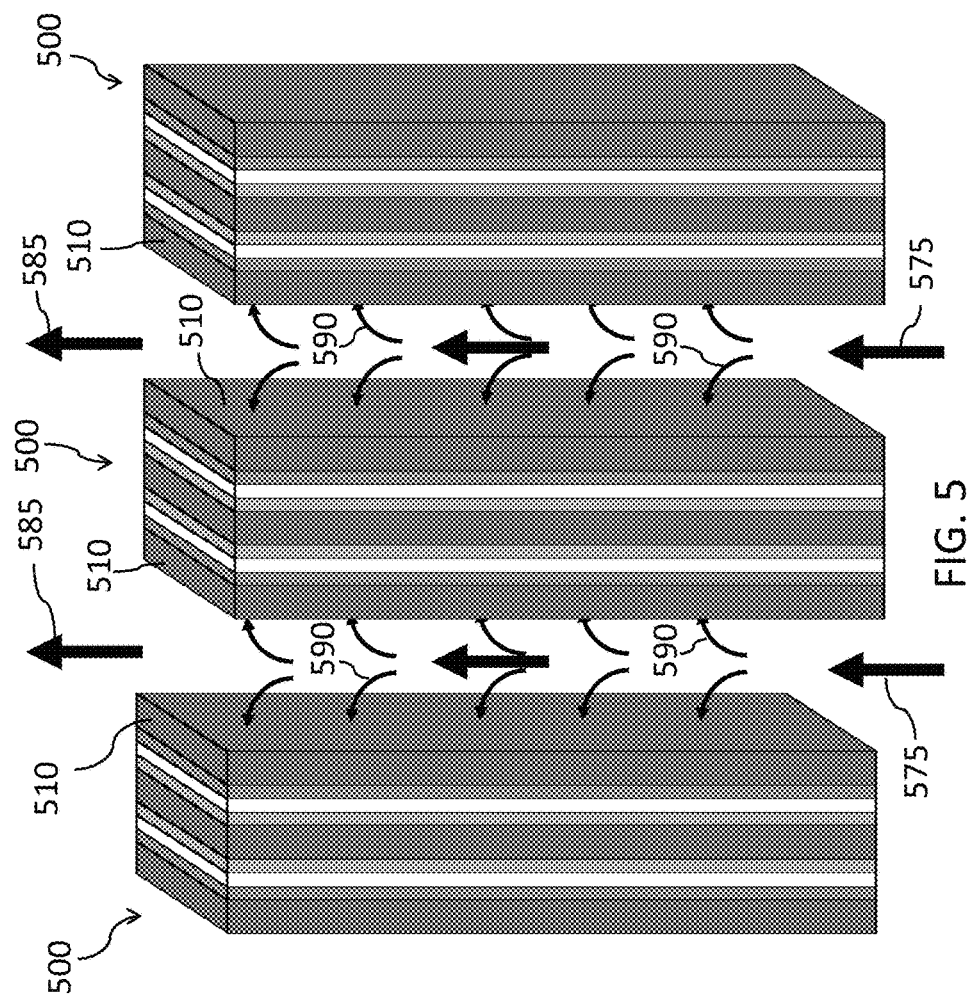
FIG. 5 shows a schematic drawing of an exemplary system performing a gas separation process, according to one or more embodiments.

FIG. 5 shows a schematic drawing of an exemplary system performing a gas separation process during a charge mode, according to one or more embodiments. In FIG. 5, a potential difference is applied across each of the electrochemical cells, so that each operates in a charge mode. In the charge mode, a redox reaction (e.g., reduction) of the electroactive species in the negative electrode 510 increases the affinity between the electroactive species and the target species 590. A gas stream 575 comprising the target species 590 is introduced to the system and passes in proximity to the negative electrodes 510. The increased affinity causes the target species (e.g., $CO_2$) to bond to the electroactive material. In this manner at least a portion of the target species is separated from the gas stream 575 to produce a treated gas stream 585.

The system 400 shown in FIG. 4 may also be operated in a discharge mode by altering the applied voltage from the power source 440 to cause an electron flow opposite to the flow direction in the charge mode. This alteration causes a different redox reaction to take place at the negative electrode 410, for example, one in which the electroactive material of the negative electrode is oxidized. Such a change in the oxidation state of the electroactive causes the target species to be released from the electroactive material to produce a target species-rich gas stream. The target species-rich gas stream may exit through outlet 480 or an alternative outlet (not shown).

Because operation in the discharge mode causes target species material to be released, it would be counter-productive to simultaneously introduce via inlet 470 a gas stream that is to be treated. Therefore, during operation in discharge mode, inlet 470 is either closed or a different stream (e.g., a waste stream) is redirected to the inlet.

According to one or more embodiments, a gas separation system may comprise a first set of electrochemical cells and a second set of electrochemical cells. Each of the first set and the second set may comprise one or more electrochemical cells as described throughout this disclosure. The first and second set may be made to run in parallel in an alternating fashion, such that one set of cells is operating in a charge mode and capturing a target species (e.g., $CO_2$) from a gas mixture while another set of cells is operating in a discharge mode and releasing the target species (e.g., $CO_2$). The system may comprise separate housings for each of the sets of electrochemical cells. The system may further comprise conduits and valving arranged to direct flow in a desired manner. The gas separation system may allow for continuous or semi-continuous separation of a gas stream, with the gas stream being directed to the set of cells operating in a charge/capture mode, at a given moment, while a separate target species-rich stream is produced by the other set of cells operating in a discharge/release mode. Furthermore, additional sets of electrochemical cells may be added in parallel or in series, according to the needs of the application.

Figure 6:
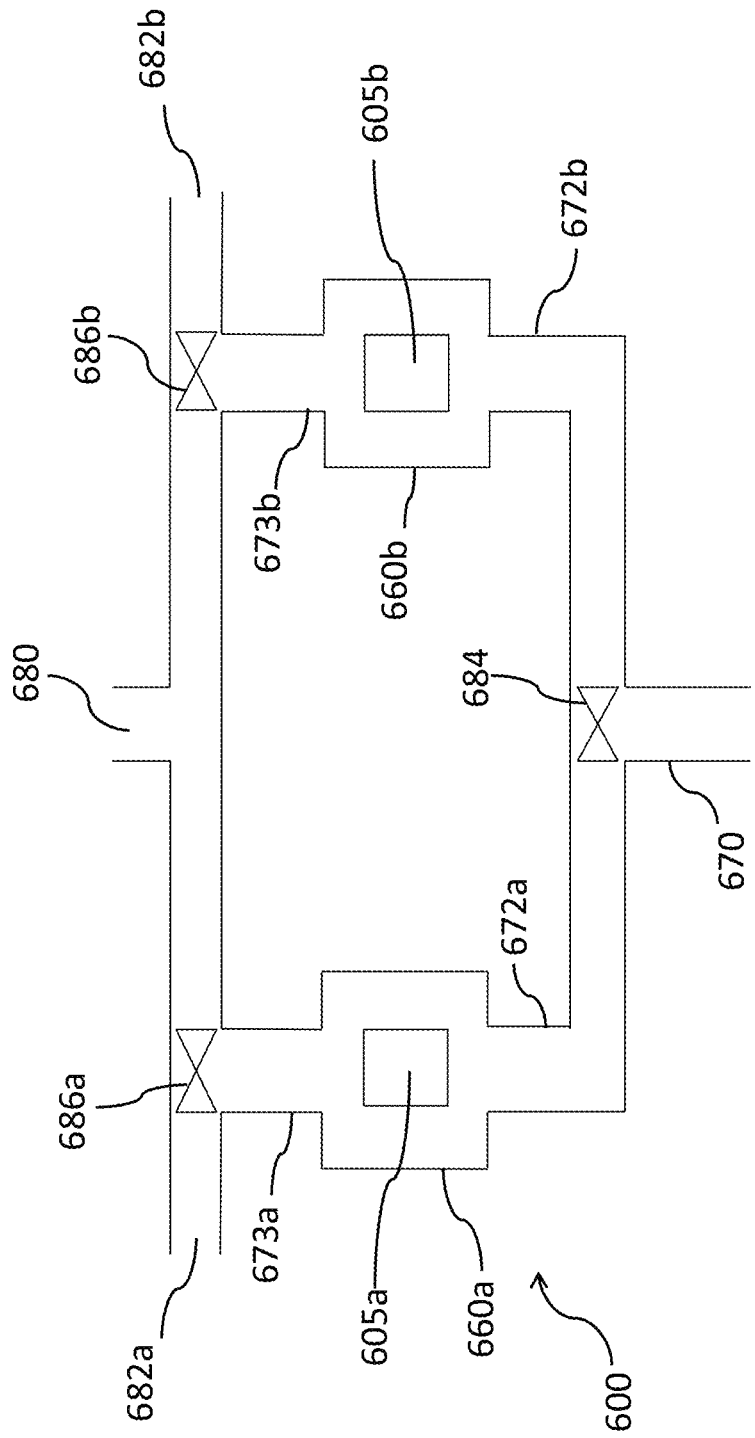
FIG. 6 shows a schematic drawing of an exemplary gas separation system, according to one or more embodiments.

FIG. 6 shows an example of an embodiment of such a gas separation system. In the gas separation system 600, a first set of electrochemical cells 605a is positioned in a first housing 660a, and a second set of electrochemical cells 605b is positioned in a second housing 660b. Conduits connect a gas inlet 670 to housing inlets 672a and 672b. A valve 684 may be arranged to direct flow to either of the sets 605a and 605b, depending on which is currently operating in a charge mode.

In operation, a gas stream comprising a target species (e.g., $CO_2$) may be introduced to the gas separation system 600 through inlet 670. When the first set of cells 605a are operating in a charge/capture mode, the valve 684 may be arranged to direct the stream to bring it into proximity to the first set of cells 605a where the target species may bond to electroactive material in the cells 605a to produce a treated gas stream (one having a reduced concentration of target species) that then exits the housing 660a through an outlet 673a. Additional valving 686a downstream of the housing outlet 673a may be arranged to direct the treated gas stream through a treated gas outlet 680.

While the first set of cells 605a are operating in a charge mode, the second set of cells 605b may be operating in a discharge mode, in which previously accumulated target species are released from the electroactive material of the second set of cells 605b. In the embodiment shown, valve 684 is arranged to isolate the gas treatment stream from the set of cells 605b operating in the discharge mode. The release of the target species from the set of cells 605b produces a target species-rich gas stream, which then exits housing 660b through outlet 673b. A valve 686b may be arranged to isolate the target-rich stream from treated stream outlet 680 and to direct the target-rich stream to waste outlet 682b, instead, where the target rich stream may undergo further processing, storage, etc.

After operating in the above manner for a period of time, the modes of cells 605a and 605b may be reversed. The first set of cells 605b are then operated in a discharge mode to release the accumulated target species from their electrodes. During this period, the valve 684 is rearranged to isolate the treatment stream from the first set of cells 605a. During this period, the valve 686*a* is rearranged to direct a target-rich stream toward a waste outlet 682*a*.

Meanwhile, the operation of the second set of cells 605*b* is reversed so that they are operated in a charge mode to capture target species and produce a treated stream. Inlet valve 684 is arranged to direct the treatment stream from system inlet 670 through conduits to the second set of cells 605*b* via second housing inlet 672*b*. The outlet valve 686*b* is rearranged to direct the treated stream to the outlet 680.

In such a manner the different sets of cells 605*a* and 605*b* may cycle through modes while, together, providing continuous or semi-continuous treatment of a gas stream comprising the target species. While the particular embodiment shown in FIG. 6 shows one particular arrangement of system components (e.g., valves, conduits, inlets, and outlets), it would be understood by a person of ordinary skill in the art, that different configurations could be provided to still meet the goal of providing continuous operation with segregated treated streams and target species-rich streams.

Figure 7A:
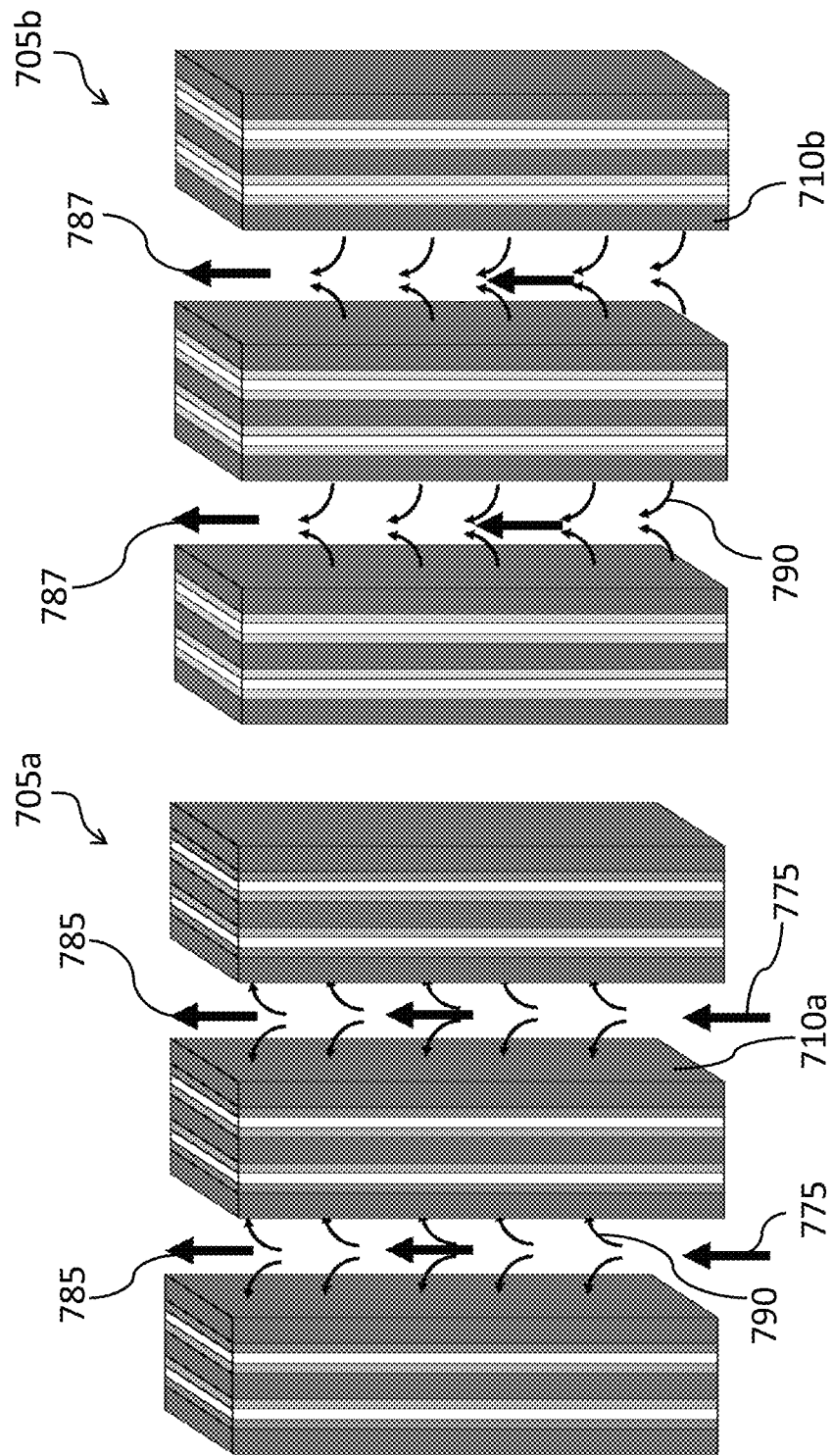
FIG. 7A shows a schematic drawing of an exemplary system performing a gas separation process, according to one or more embodiments.

FIG. 7A shows a schematic drawing of an exemplary system, similar to that of FIG. 6, performing a gas separation process in which a first set of cells 705*a* are operating in a charge mode, while a second set of cells 705*b* are operating in a discharge mode, according to one or more embodiments. In the charge mode, an applied voltage induces a redox reaction (e.g., reduction) of the electroactive species in the negative electrode 710*a* that increases the affinity between the electroactive species and the target species 790. A gas stream 575 comprising the target species 590 is introduced to the set of cells 705*a* and passes in proximity to the negative electrodes 510*a*. The increased affinity causes the target species (e.g., $CO_2$) 790 to bond to the electroactive material. In this manner at least a portion of the target species is separated from the gas stream 775 to produce a treated gas stream 785.

In the discharge mode, a second applied voltage, causing an electron flow in the opposite direction from that during the charge mode, induces a second redox reaction (e.g., oxidation) of the electroactive species in the negative electrode 710*b* that decreases the affinity between the electroactive species and the target species 790. The released target species 790 enters a target species-rich gas stream 787.

Figure 7B:
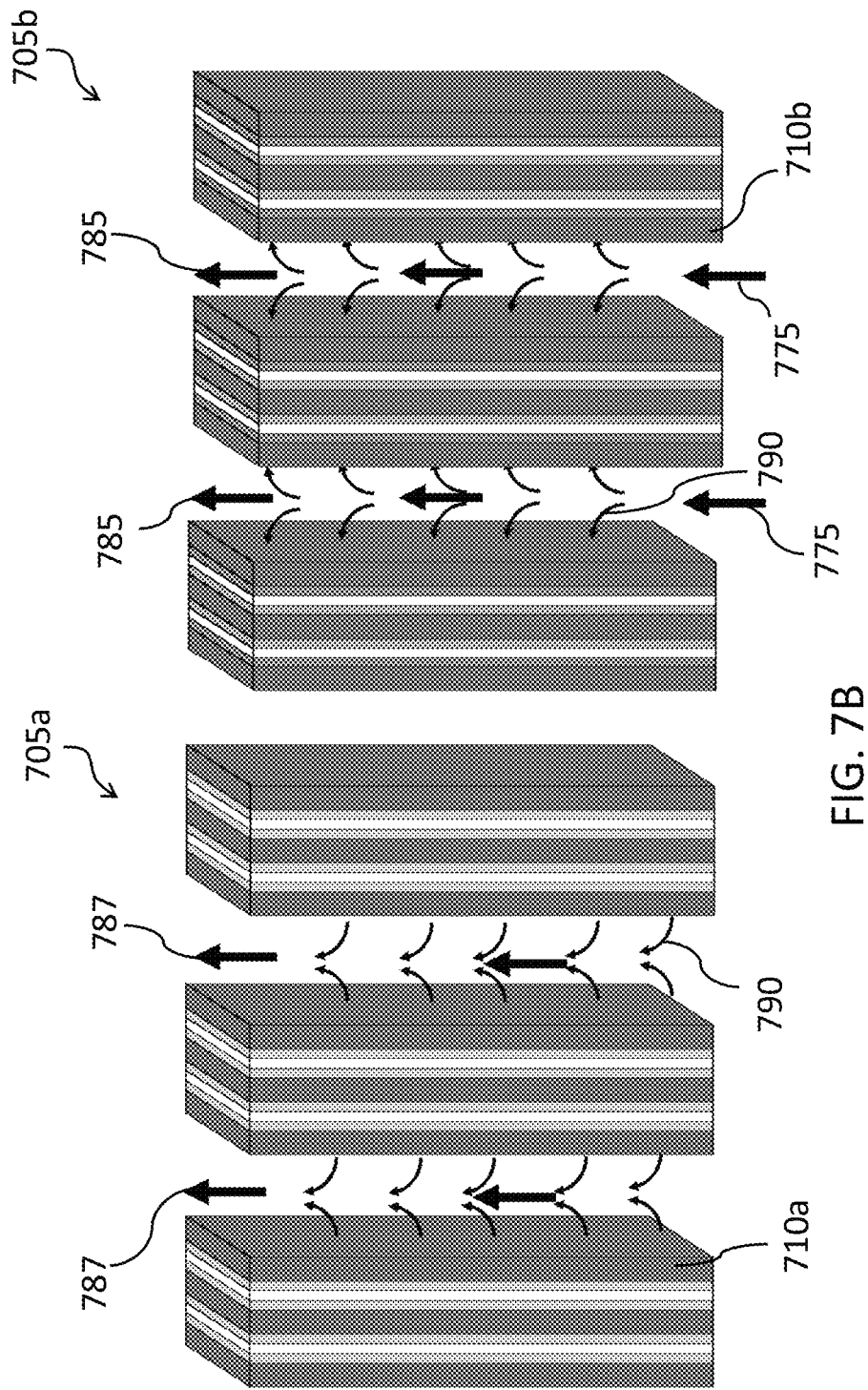
FIG. 7B shows a schematic drawing of an exemplary system performing a gas separation process, according to one or more embodiments.

FIG. 7B shows a schematic drawing of an exemplary system, similar to that of FIG. 6, performing a gas separation process in which the operation modes shown and described for FIG. 7A have been reversed. In FIG. 7B, the voltage applied across the first set of cells 705*a* has been altered and the cells 705*a* are operated in a discharge mode to release stored target species 790 from the negative electrodes 710*a* to produce a target species-rich gas stream. Meanwhile, the voltage applied across the second set of cells 705*b* has also been altered, causing them to operate in a charge mode. The target species 790 of treatment stream 775 bonds to the negative electrodes 710*b* to produce a treated stream 785.

The electrochemical cells, systems, and methods described herein may be implemented in a variety of applications. The number of cells or sets of cells may be scaled to the requirements of a particular application as needed. In some embodiments, the systems and methods described herein may be for removing $CO_2$ from industrial flue gas as well as enclosed spaces such as airtight building, car cabins—reducing the heating cost of incoming air for ventilation—and submarines and space capsules, where an increase in $CO_2$ levels could be catastrophic. In embodiments directed to the electrical power industry, they may be used for capturing carbon dioxide post-combustion at varying concentrations. Also, they may be used for capturing sulfur dioxide and other gases from flue gas. In embodiments directed to the oil and gas industry, the disclosed systems and methods may be used for capturing carbon dioxide and other gases from various processes and diverting them for downstream compression and/or processing. The disclosed systems and methods may be applied to capture carbon dioxide from burning natural gas used to heat the greenhouses in mild and cold climates, then diverting the captured dioxide into the greenhouse for the plants to use in photosynthesis, i.e., to feed the plants.

According to one or more embodiments, the gas stream, or treatment stream, may be introduced to the gas separation system at a particular flow rate. In some embodiments the flow rate is between 1 ml/min and 100 ml/min. In some embodiments, the flow rate is between 1 ml/min and 20 ml/min. Given the scalability of the system, other flow rates are also possible.

According to one or more embodiments the target species (e.g., $CO_2$) in the introduced gas stream may have a particular concentration. In some embodiments, the target species concentration may be between 10 ppm and 500 ppm. In some embodiments the concentration may be between 0.5% and 15% by volume. Higher concentrations are also possible.

In some embodiments, the electrochemical cell may have a particular cycle time, the period of time in performance of one charge mode and one discharge mode. The cycle time may be between 60 and 3600 seconds, or between 300 and 1800 seconds. Other cycle times are also possible.

In some embodiments, the electroactive composite layer of the negative electrode may have a particular capacity for absorbing target species (e.g., $CO_2$). For example, in some embodiments, the electroactive composite layer may have an absorption capacity of between 0.01 and 0.1 mol per $m^2$. In some embodiments, the electroactive composite layer may have an absorption capacity of between 0.01 and 0.03 mol per $m^2$. Other absorption capacities are also possible.

In some embodiments, the electrochemical cell may be operated the electroactive composite layer of the negative electrode may be able to absorb target species (e.g., $CO_2$) at a particular rate. For example, in some embodiments, the electroactive composite layer may have an absorption capacity rate of between 0.0001 and 0.001 mol per $m^2$ per second. In some embodiments, the electroactive composite layer may have an absorption capacity rate of between 0.0001 and 0.0005 mol per $m^2$ per second. Other absorption capacities rates are also possible.

In some embodiments the electroactive composite layer of a negative electrode may have a particular surface area that is exposed to the gas stream, for example, between 5 and 20 $cm^2$. Other values are also possible.

In some embodiments the gas permeable layer of the negative electrode or the substrate layer of the positive electrode may have a particular porosity, for example the porosity may be between 60% and 90%. Other values are also possible.

According to some embodiments, the electrochemical cell and its components may have a particular thickness. In some embodiments, the electrochemical cell may have a thickness of between 200 μm and 750 μm. In some embodiments, the electroactive composite layer of the negative electrode or the positive electrode may have a thickness of between 10 μm and 200 μm. In some embodiments, the negative electrode or the positive electrode may have a thickness of between 50 μm and 200 μm. Other values are also possible.

The term "electrochemical cell," as used herein refers to an apparatus in which redox half reactions take place at negative and positive electrodes. The term "electrochemical cell" is intended to include apparatuses that meet these criteria even where the behavior of the cell could arguably be characterized as more pseudocapacitive than Faradaic and thus might otherwise be referred to as a type of capacitor.

As used herein, an electroactive species generally refers to an agent (e.g., chemical entity) which undergoes oxidation or reduction upon exposure to an electrical potential in an electrochemical cell.

In some embodiments, an electrode is utilized comprising a porous material. The porous electrode may be made of any suitable material and/or may comprise any suitable shape or size. In a non-limiting embodiment, the electrode comprises a porous carbonaceous material. The term carbonaceous material is given its ordinary meaning in the art and refers to a material comprising carbon or graphite that is electrically conductive. Non-limiting example of carbonaceous materials include carbon nanotubes, carbon fibers (e.g., carbon nanofibers), and/or graphite. In such embodiments, the electrode may be partially fabricated from the carbonaceous material or the carbonaceous material may be deposited over an underlying material. The underlying material generally comprises a conductive material, for example, a metal. Other non-limiting examples of conductive materials are described herein.

In some embodiments, an electrode is porous. The porosity of an electrode may be measured as a percentage or fraction of the void spaces in the electrode. The percent porosity of an electrode may be measured using techniques known to those of ordinary skill in the art, for example, using volume/density methods, water saturation methods, water evaporation methods, mercury intrusion porosimetry methods, and nitrogen gas adsorption methods. In some embodiments, the electrode may be at least about 10% porous, at least about 20% porous, at least about 30% porous, at least about 40% porous, at least about 50% porous, at least about 60% porous, at least about 70% porous or greater. The pores may be open pores (e.g., have at least one part of the pore open to an outer surface of the electrode and/or another pore) In some cases, only a portion of the electrode may be substantially porous. For example, in some cases, only a single surface of the electrode may be substantially porous. As another example, in some cases, the outer surface of the electrode may be substantially porous and the inner core of the electrode may be substantially non-porous. In a particular embodiment, the entire electrode is substantially porous.

Various components of a system, such as the electrode, power source, electrolyte, separator, container, circuitry, insulating material, etc. can be fabricated by those of ordinary skill in the art from any of a variety of components, as well as those described in any of those patent applications described herein. Components may be molded, machined, extruded, pressed, isopressed, infiltrated, coated, in green or fired states, or formed by any other suitable technique. Those of ordinary skill in the art are readily aware of techniques for forming components of system herein.

The electrode may be of any size or shape. Non-limiting examples of shapes include sheets, cubes, cylinders, hollow tubes, spheres, and the like. The electrode may be of any size. Additionally, the electrode may comprise a means to connect the electrode to another electrode, a power source, and/or another electrical device.

Various electrical components of system may be in electrical communication with at least one other electrical component by a means for connecting. A means for connecting may be any material that allows the flow of electricity to occur between a first component and a second component. A non-limiting example of a means for connecting two electrical components is a wire comprising a conductive material (e.g., copper, silver, etc.). In some cases, the system may also comprise electrical connectors between two or more components (e.g., a wire and an electrode). In some cases, a wire, electrical connector, or other means for connecting may be selected such that the resistance of the material is low. In some cases, the resistances may be substantially less than the resistance of the electrodes, electrolyte, and/or other components of the system.

In some embodiments, a power source may supply DC voltage to a system. Non-limiting examples include batteries, power grids, regenerative power supplies (e.g., wind power generators, photovoltaic cells, tidal energy generators), generators, and the like. The power source may comprise one or more such power supplies (e.g., batteries and a photovoltaic cell).

In some embodiments, a system may comprise a separator, otherwise referred to as a separating membrane. A separating membrane may be made of suitable material, for example, a plastic film. Non-limiting examples of plastic films included include polyamide, polyolefin resins, polyester resins, polyurethane resin, or acrylic resin and containing lithium carbonate, or potassium hydroxide, or sodium-potassium peroxide dispersed therein.

The following examples are intended to illustrate certain embodiments of the present invention, but do not exemplify the full scope of the invention.

EXAMPLES

Example 1

This example describes a non-limiting procedure for synthesizing Poly(1,4-anthraquinone) (P14AQ), which may function as an electroactive material in the negative electrode of an electrochemical cell, according to one or more embodiments described herein. A solution of 1.510 g (5.45 mmol) dichloro-1,4-anthraquinone in 20 ml dimethylformamide (DMF) was added dropwise to a solution of 2.000 g (7.27 mmol) of bis(1,5-cyclooctadiene)nickel(0), 1.134 g (7.27 mmol) of 2,2'-bipyridyl and 0.7 ml (5.45 mmol) of 1,5-cyclooctadiene in 50 ml DMF, stirring at 65° C. under Nitrogen. The mixture reacted at 65° C. for 72 h. After cooling to room temperature, 100 ml of 1 M hydrochloric acid (HCl) was added to reaction mixture and allowed to stir at room temperature for 1 h. The mixture was then filtered and washed with 200 ml of 1 M HCl, twice with 200 ml of de-ionized water, twice with 100 ml DMF followed by 100 ml water and 100 ml methanol washes. The residue was dried under vacuum for 24 h. The procedure yielded 1.084 g polymer (96% yield).

Example 2

This example describes a non-limiting procedure for synthesizing Polymer-Multi-Walled Carbon Nanotube (MWCNT) composites comprising Poly(1,4-anthraquinone) (P14AQ), which may function as a primary electroactive composite layer of an electrochemical cell, according to one or more embodiments described herein. The composite was made by ultra-sonicating a suspension of 40 mg of P14AQ (as made according to the process described in Example 1) and 120 mg MWCNT in 40 ml of chloroform at 15° C. for 40 minutes, resulting in a well-dispersed ink. The ratio of P14AQ to CNT was optimized and the highest current per mass of active material (polymer) was obtained with a 1 to 3, P14AQ to CNT by weight ratio. The resulting composites showed more than 30-fold improvement in current, compared to pure P14AQ, due to the higher surface area of the polymer exposed to electrolyte, with CNT providing the bulk of the conductivity via π-π interactions and creating a porous matrix decorated by the polymer chains for electrolyte penetration. The two reduction potentials of P14AQ under $N_2$ are $E_1^0 = -1.15$ V and $E_2^0 = -1.58$V, against AglA-gNO$_3$ reference electrode, which under $CO_2$ become a single quasi-reversible redox couple at the first reduction potential, $E_1^0 = -1.15$ V.

Example 3

This example describes a non-limiting procedure for synthesizing Polymer-Multi-Walled Carbon Nanotube (MWCNT) composites comprising polyvinyl ferrocene (PVF), which may function as a complementary electroactive composite layer of an electrochemical cell, according to one or more embodiments described herein. The PVF-CNT composite was made by ultra-sonicating a suspension of 160 mg of PVF (purchased from Polysciencens, Inc.) and 160 mg MWCNT in 40 ml of chloroform at 15° C. for 60 minutes, resulting in a well-dispersed ink. This resulted in an electrochemical window of ~1.2V under $CO_2$, i.e. the reduction potential of PVF (0.05 V vs AglAgNO$_3$) and the first reduction potential of P14AQ (−1.15 V vs AglAgNO$_3$). The optimum ratio of the composite was found to be 1 to 1, PVF to CNT, by weight. The balancing of the capacity of the electroactive layer composite material for use in the negative and positive electrodes was done by the gravimetric charge calibration and was found to be $m_{anode} = 1.12 m_{cathode}$.

Example 4

This example describes a non-limiting procedure for synthesizing the electrodes of an electrochemical cell, according to one or more embodiments described herein.

To form the electrode, substrate material such as Teflon treated Toray carbon paper, untreated carbon paper, carbon cloth (purchased from ElectroChem Inc.), nonwoven carbon mat (purchased from Marktek, Inc.), which may serve as a gas permeable layer for a negative electrode or a substrate layer for a positive electrode, was dip-coated into the polymer-CNT inks (as made according to the process described in Example 2 or Example 3) multiple times to deposit a certain mass of the composite. Alternatively, the inks were dropcast onto the electrode substrate (the Teflon treated ones).

Example 5

This example describes a non-limiting procedure for fabricating an electrochemical cell, according to one or more embodiments described herein. The electrochemical cells were assembled by stacking an electrode substrates coated with P14AQ-CNT, an electrolyte separator, an electrode substrates coated with PVF-CNT, an electrolyte separator, an electrode substrates coated with P14AQ-CNT. The electrolyte separators were either Whatman cellulose filter paper, saturated in ionic liquid electrolyte 1-butyl-3-methylimidazolium tetrafluoroborate (BmimBF$_4$), or Celgard 3501 saturated in ionic liquid electrolyte. Copper wire and conductive copper tape were used as current collector.

Example 6

This example demonstrates successful operation of an electrochemical cell formed according to the methods described in the above examples. The electrochemical cell was tested by chronoamperometric (constant potential difference) experiments in a sealed chamber that was filled with $CO_2$ at atmospheric pressure and the pressure change due to capture and release of $CO_2$ was monitored. The reduction of P14AQ-CNT was achieved by applying a potential difference across the cell of $E_2^0 < -1.5$ V$< E_1^0$ and the oxidation at $E_1^0 < +0.5$ V, against the PVF anode, which was a large overpotential to drive the reaction backwards, given the quasi-reversible nature of the reductive addition of $CO_2$ to the anthraquinone units.

Upon charging the cell (negative charge), reduced quinones react with $CO_2$ decreasing the overall pressure in the cell, while upon discharging (positive charge) the anthraquinone-$CO_2$ complex is dissociated due to the breaking of the covalent bond in the carbonate moiety, and $CO_2$ molecules, as well as anthraquinone units are regenerated, restoring the original pressure in the chamber. The Faradaic efficiency was calculated from the number of moles of $CO_2$ captured and the charge applied:

$$\eta_{Farad.} = \frac{Fn_{CO_2}}{Q}$$

This was found to be 72% (the highest), given an internal volume of the sealed chamber of 60 cm$^3$. Also, the energy per mole captured was calculated from the charge and potential difference:

$$E = QV$$

According to some embodiments, the energy may be between 30-70 kJ per mole of $CO_2$ captured, under the optimum operating conditions.

Figure 8A:
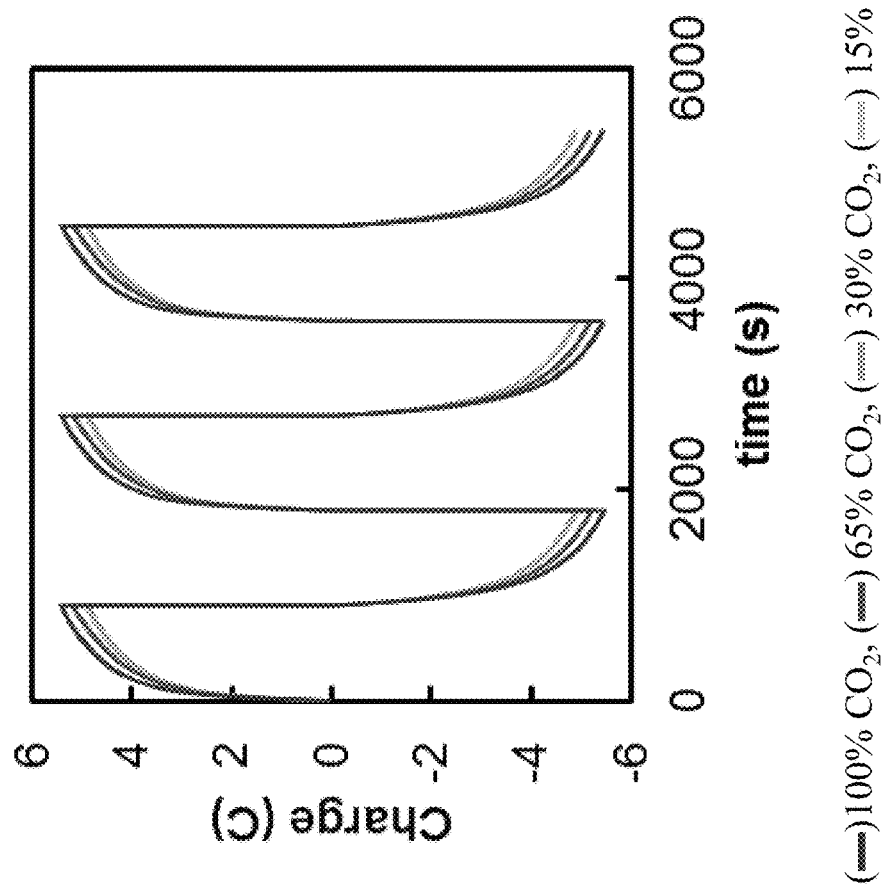
FIGS. 8A-8C show graphical representations of the experimental results of $CO_2$ capture and release by a gas separation process, according to one or more embodiments.
Figure 8B:
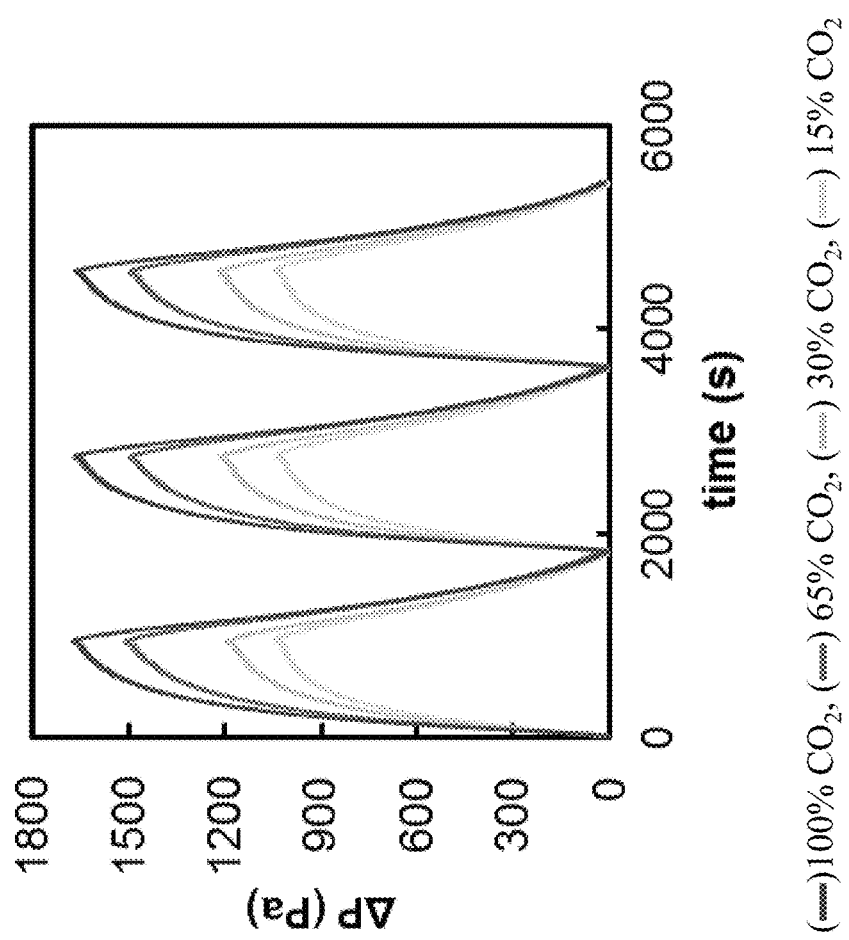
Figure 8C:
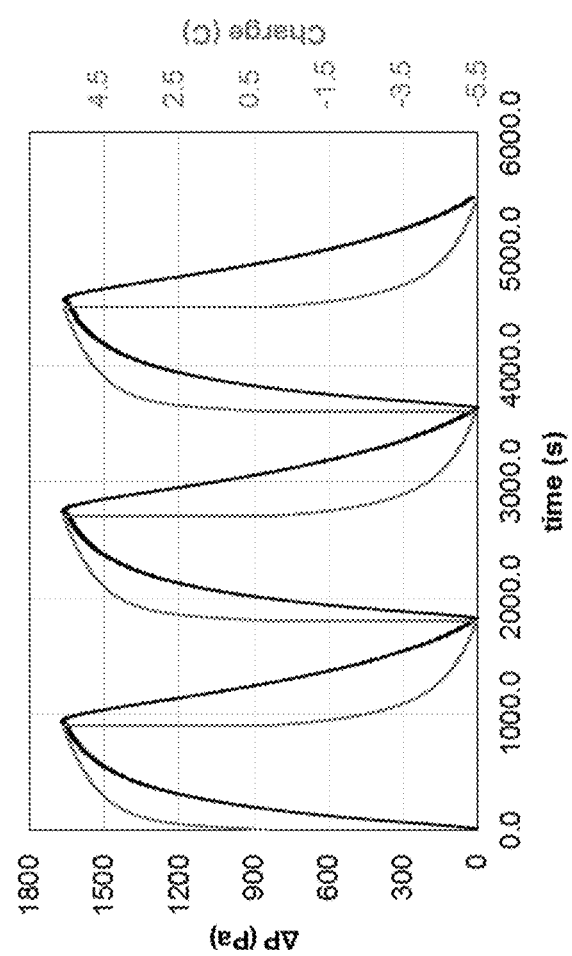

Potential difference was applied across the power feedthroughs that were connected to the electrochemical cells, and the decrease and increase in pressure in the chamber, upon capture and release, respectively, was monitored using a pressure transducer. The decrease and increase in pressure in the chamber, upon capture and release, respectively, was monitored using a pressure transducer. FIG. 8A shows three charging and discharging cycles of the electrochemical cells in a closed system at different concentrations of $CO_2$. FIG. 8B shows the resulting fluctuation in pressure due to capture and release of $CO_2$ at different concentration resulting from the charging and discharging of the cells. FIG. 8C shows the electrochemical charging and discharging superimposed on the pressure fluctuations in a 100% $CO_2$ closed system. The absorption and release of $CO_2$, indicated by the change in pressure of the closed system, demonstrate that the electrochemical cell operates for its intended use.

Example 7

This example demonstrates successful operation in a flow-through system. The chronoamperometric experiments that were conducted in the sealed system (Example 6) were repeated in a flow system, where a stack of the assembled electrochemical cells was placed in a flow chamber and gas mixtures of $N_2$ and $CO_2$, at different concentrations of $CO_2$, were flown past the stack.

Ten electrochemical cells were assembled with two negative (PAQ-CNT) electrodes and one positive (PVF-CNT) electrode. The surface area of each electrochemical cell exposed to gas was 45 cm$^2$, the total area of all the stack exposed to gas was 450 cm$^2$. PAQ-CNT electrodes had a total loading of 500 mg of active material (375 mg CNT and 125 mg PAQ). The PVF-CNT electrodes had a total loading of 600 mg (300 mg PVF and 300 mg CNT). The stack of these cells, separated by 2 mm, was placed in a gas flow chamber (the experimental setup) and gas was flown past them. Mixtures of nitrogen and carbon dioxide at 10 ml/min and three inlet concentrations of $CO_2$ were studied. The bed volume of the system was 270 cm$^3$.

Figure 9:
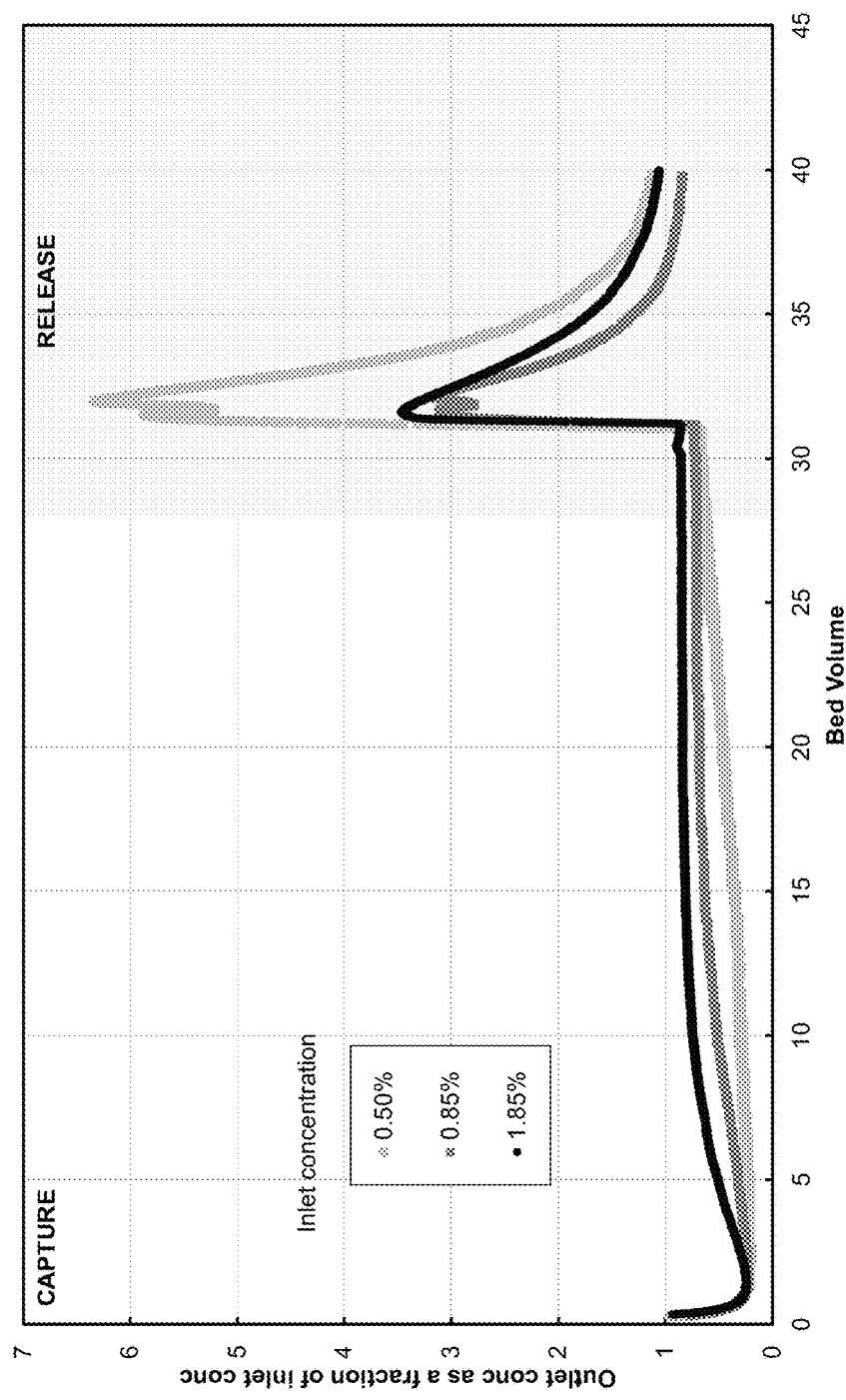
FIG. 9 shows a graphical representation of the experimental results of $CO_2$ capture and release by a gas separation process, according to one or more embodiments.
Figure 10:
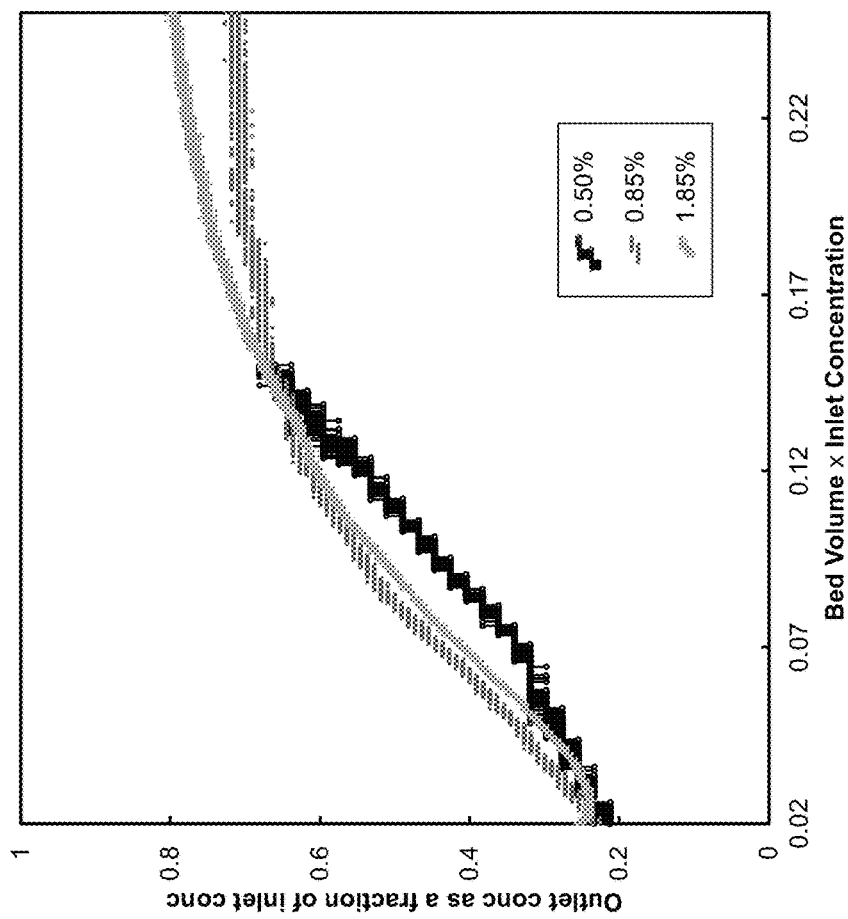
FIG. 10 shows a graphical representation of the experimental results of $CO_2$ capture and release by a gas separation process, according to one or more embodiments.

Upon the reduction of the PAQ-CNT electrodes, i.e. operation of the cells in a charge mode, $CO_2$ was removed (captured) from the inlet stream (i.e., gas treatment stream), the decrease in the concentration of $CO_2$ was detected in the outlet stream. About 30 bed volumes of the gas mixture was treated and the bed was saturated, after which $CO_2$ was released. Upon oxidation, i.e. operation of the cells in a discharge mode, $CO_2$ was released into the same stream and the increase in the concentration of $CO_2$ was detected in the outlet stream, shown in FIG. 9. The sum of the total decrease in concentration during capture is equal to the sum of the total increase in concentration during release, this was 24 ml of $CO_2$. FIG. 10 shows the breakthrough profile of the capture portion of the curves in FIG. 9, as the inlet concentration increases, breakthrough is achieved at a lower number of bed volumes. Based on the application, a threshold outlet concentration can be set, upon achieving which, the stack of cells is regenerated by applying the oxidation potential. In practice, a number of these stacks would operate in parallel, where one or more stacks are capturing $CO_2$ from the $CO_2$-rich stream to generate a $CO_2$-lean stream, and the other stacks are being regenerated by releasing $CO_2$ into a purge or a sweep stream.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
a first negative electrode and a second negative electrode, each comprising a gas permeable layer and a primary electroactive composite layer;
a positive electrode positioned between the first and second negative electrodes and comprising a first complementary electroactive composite layer facing the first negative electrode and a second complementary electroactive composite layer facing the second negative electrode;
a first separator positioned between the first negative electrode and the positive electrode; and
a second separator positioned between the second negative electrode and the positive electrode, wherein each of the first and second separators is able to be saturated with an ionic liquid.

2. The electrochemical cell of claim 1, wherein the primary electroactive composite layer comprises a first electroactive species capable of bonding with carbon dioxide gas, when the first electroactive species is in a reduced state, and releasing carbon dioxide gas, when the first electroactive species is in an oxidized state.

3. The electrochemical cell of claim 1, wherein the primary electroactive composite layer comprises a first electroactive species that in a reduced state has a binding constant with carbon dioxide of $10^1$ to $10^3$ $M^{-1}$.

4. The electrochemical cell of claim 1, wherein the primary electroactive composite layer comprises a first electroactive species comprising polyanthraquinone.

5. The electrochemical cell of claim 1, wherein the complementary electroactive composite layer comprises a second electroactive species comprising polyvinyl ferrocene.

6. The electrochemical cell of claim 1, wherein the primary electroactive composite layer comprises a first immobilized polymeric composite of a first electroactive species and of a first carbonaceous material.

7. The electrochemical cell of claim 6, wherein the complementary electroactive composite layer comprises a second immobilized polymeric composite of a second electroactive species and of a second carbonaceous material.

8. The electrochemical cell of claim 1, wherein the positive electrode further comprises a substrate layer positioned between the first and second complementary electroactive composite layers.

9. The electrochemical cell of claim 1, wherein each of the first and second separators is saturated with a room temperature ionic liquid.

10. The electrochemical cell of claim 1, wherein the room temperature ionic liquid comprises Bmim $BF_4$.

11. A gas separation system, comprising:
a plurality of electrochemical cells in fluid communication with a gas inlet and a gas outlet, each of the plurality of electrochemical cells comprising:
a first porous negative electrode and a second porous negative electrode, each comprising a first electroactive species;
a positive electrode comprising a second electroactive species;
a first separator positioned between the first porous negative electrode and the positive electrode; and
a second separator positioned between the second porous negative electrode and the positive electrode, wherein each of the first and second separators is able to be saturated with an ionic liquid.

12. The gas separation system of claim 11, wherein the first electroactive species is immobilized in a first polymeric composite.

13. The gas separation system of claim 12, wherein the second electroactive species is immobilized in a second polymeric composite.

14. The gas separation system of claim 11, wherein the first electroactive species comprises polyanthraquinone.

15. The gas separation system of claim 14, wherein the second electroactive species comprising polyvinyl ferrocene.

16. The gas separation system of claim 11, further comprising an external circuit connecting the first and second porous negative electrodes and the positive electrode of each electrochemical cell to a power source configured to apply a potential difference across the first and second negatives electrodes and the positive electrode of each electrochemical cell.

* * * * *